US011955061B2

(12) United States Patent
Cong et al.

(10) Patent No.: US 11,955,061 B2
(45) Date of Patent: Apr. 9, 2024

(54) PIXEL DRIVING CIRCUITS AND DISPLAY DEVICES

(71) Applicants: Beijing BOE Display Technology Co., Ltd., Beijing (CN); BOE Technology Group Co., Ltd., Beijing (CN)

(72) Inventors: Ning Cong, Beijing (CN); Xiaochuan Chen, Beijing (CN); Minghua Xuan, Beijing (CN); Can Zhang, Beijing (CN); Ming Yang, Beijing (CN); Lijun Yuan, Beijing (CN); Angran Zhang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/787,479

(22) PCT Filed: Mar. 3, 2021

(86) PCT No.: PCT/CN2021/078857
§ 371 (c)(1),
(2) Date: Jun. 20, 2022

(87) PCT Pub. No.: WO2021/190263
PCT Pub. Date: Sep. 20, 2021

(65) Prior Publication Data

US 2023/0043626 A1 Feb. 9, 2023

(30) Foreign Application Priority Data

Mar. 24, 2020 (CN) ......................... 202010211743.9

(51) Int. Cl.
*G09G 3/3208* (2016.01)
*G09G 3/32* (2016.01)
(Continued)

(52) U.S. Cl.
CPC ....... *G09G 3/32* (2013.01); *G09G 2300/0842* (2013.01); *G09G 2310/061* (2013.01);
(Continued)

(58) Field of Classification Search
CPC ............. G09G 3/32; G09G 2300/0842; G09G 2310/061; G09G 2310/08; G09G 2320/0233–0247
See application file for complete search history.

(56) References Cited

U.S. PATENT DOCUMENTS 5,506,529 A * 4/1996 Baldwin ............. H03K 23/662 327/107
10,796,665 B1 10/2020 Hsieh et al.
(Continued)

FOREIGN PATENT DOCUMENTS

CN WO 2020/220613 A1 * 11/2015 ........... G09G 3/3208
CN 108538241 A * 9/2018 ............... G06G 3/32
(Continued)

OTHER PUBLICATIONS

CN2020102117439 first office action.
(Continued)

*Primary Examiner* — Lin Li
(74) *Attorney, Agent, or Firm* — IPro, PLLC

(57) ABSTRACT

Provided is a pixel driving circuit configured to provide a signal to a to-be-driven element. The pixel driving circuit includes: a current control sub-circuit, configured to transmit a current signal; a time length control sub-circuit, configured to transmit a time signal; and an output sub-circuit, electrically connected with the time length control sub-circuit and the current control sub-circuit, respectively; where the time length control sub-circuit is further configured to control the output sub-circuit to be turned on or off based on the time signal; the output sub-circuit is configured to, when turned
(Continued)

on, control a current applied to the to-be-driven element based on the current signal, where duration of two adjacent turn-ons of the output sub-circuit is same and duration of two adjacent turn-offs of the output sub-circuit is same.

18 Claims, 12 Drawing Sheets

(51) Int. Cl.
*G09G 3/3233* (2016.01)
*G09G 3/3258* (2016.01)
*H03K 5/24* (2006.01)

(52) U.S. Cl.
CPC . *G09G 2310/08* (2013.01); *G09G 2320/0233* (2013.01); *G09G 2320/0247* (2013.01)

(56) References Cited

U.S. PATENT DOCUMENTS

2002/0140659 A1* 10/2002 Mikami ............... G09G 3/3258 345/90
2016/0118971 A1* 4/2016 Sugiyama .............. H03K 5/249 341/158
2017/0069264 A1* 3/2017 Dai ...................... G09G 3/3233
2019/0156751 A1* 5/2019 Zhang .................. G09G 3/2092
2020/0380910 A1* 12/2020 He ........................... G09G 3/32
2021/0027699 A1 1/2021 Zheng et al.
2021/0366354 A1* 11/2021 Li ........................ G09G 3/3266
2021/0366364 A1* 11/2021 Xuan ....................... G09G 3/32
2022/0005403 A1* 1/2022 Yue .......................... G09G 3/32
2022/0076616 A1 3/2022 Liu et al.
2022/0139315 A1 5/2022 Lin et al.

FOREIGN PATENT DOCUMENTS

CN 109410832 A 3/2019
CN 110021263 A 7/2019
CN 110310594 A 10/2019
CN 110782831 A 2/2020
CN WO 2020/098034 A1 * 5/2020 ......... H01L 27/1214
CN 111243499 A 6/2020

OTHER PUBLICATIONS

CN2020102117439 second office action.
PCT/CN2021/078857 international search report.
PCT/CN2021/078857 Written Opinion.

* cited by examiner

PIXEL DRIVING CIRCUITS AND DISPLAY DEVICES

CROSS-REFERENCE TO RELATED APPLICATION

The present application is a US national phase of International patent application No. PCT/CN2021/078857 filed on Mar. 3, 2021, which claims priority to Chinese Patent Application No. 2020102117439 filed on Mar. 24, 2020 to CNIPA, the contents of which are incorporated here in its entirety by reference.

TECHNICAL FIELD

One or more embodiments of the present disclosure relates to pixel driving circuits and display devices.

BACKGROUND

Due to advantages such as high brightness, long service life, small volume, etc., micro inorganic light emitting diodes are usually applied to display devices and thus have broad development prospect in the display field. However, such micro inorganic light emitting diodes in the display devices may flicker due to a short total light emission time length and non-uniform light emission time within time of one frame in some scenarios, for example, the micro inorganic light emitting diodes perform display at low-gray-level (i.e. low brightness).

SUMMARY

At least one embodiment of the present disclosure provides a pixel driving circuit configured to provide a signal for a to-be-driven element. The pixel driving circuit includes: a current control sub-circuit, configured to transmit a current signal; a time length control sub-circuit, configured to transmit a time signal; and an output sub-circuit, electrically connected with the time length control sub-circuit and the current control sub-circuit respectively. The time length control sub-circuit is further configured to control the output sub-circuit to be turned on or off based on the time signal. The output sub-circuit is configured to, when turned on, control a current applied to the to-be-driven element based on the current signal, where duration of two adjacent turn-ons of the output sub-circuit is same and duration of two adjacent turn-offs of the output sub-circuit is same.

In some embodiments of the present disclosure, the time length control sub-circuit includes a comparator, and the comparator is configured to compare the time signal and a reference voltage signal to generate a comparison signal and control the output sub-circuit to be turned on or off based on the comparison signal, where the comparison signal is a periodic square wave signal.

In some embodiments of the present disclosure, the comparator includes a non-inverting input terminal, an inverting input terminal and an output terminal; the non-inverting input terminal is configured to receive one of the time signal and the reference voltage signal; the inverting input terminal is configured to receive other of the time signal and the reference voltage signal; the output terminal is connected with the output sub-circuit.

In some embodiments of the present disclosure, the reference voltage signal includes one of a ramp signal, a triangle wave signal, a sawtooth wave signal, a sine wave signal and a cosine wave signal.

In some embodiments of the present disclosure, the reference voltage signal is a high frequency signal, and a frequency of the reference voltage signal is equal to or greater than 750 Hz and equal to or smaller than 7500 Hz.

In some embodiments of the present disclosure, the time length control sub-circuit further includes a time length write sub-circuit and a time length storage capacitor; the time length write sub-circuit is connected with the non-inverting input terminal or the inverting input terminal of the comparator; a first terminal of the time length storage capacitor is grounded and a second terminal of the time length storage capacitor is connected with the time length write sub-circuit and connected with the comparator.

In some embodiments of the present disclosure, the current control sub-circuit includes a current write sub-circuit and a compensation sub-circuit. The compensation sub-circuit is connected with the current write sub-circuit and the output sub-circuit. A first terminal of the current write sub-circuit is configured to receive the current signal and a second terminal of the current write sub-circuit is connected with the compensation sub-circuit. A first terminal of the compensation sub-circuit is connected with the current write sub-circuit and a second terminal of the compensation sub-circuit is connected with the output sub-circuit.

In some embodiments of the present disclosure, the compensation sub-circuit includes a compensation transistor, a current storage capacitor and a first drive transistor. A first electrode of the first drive transistor is connected with the current write sub-circuit, a second electrode of the first drive transistor is connected with a first electrode of the compensation transistor, a gate electrode of the first drive transistor and a second electrode of the compensation transistor are both connected with the current storage capacitor, and a gate electrode of the compensation transistor is connected with a data write control signal line.

In some embodiments of the present disclosure, a width-length ratio of the first drive transistor is greater than 3.

In some embodiments of the present disclosure, the current write sub-circuit includes a current write transistor.

In some embodiments of the present disclosure, the pixel driving circuit further includes a work control sub-circuit. The work control sub-circuit includes a first control transistor; a first electrode of the first control transistor is connected with the current control sub-circuit; a second electrode of the first control transistor is connected with the output sub-circuit; a gate electrode of the first control transistor is connected with a work control signal line. The work control signal line is configured to input a work control signal to the first control transistor so as to control the first control transistor to be turned on or off; where the first control transistor is configured to, when turned on, transmit the current signal to the output sub-circuit.

In some embodiments of the present disclosure, the work control sub-circuit further includes a second control transistor. A first electrode of the second control transistor is connected with a power supply terminal, and a second electrode of the second control transistor is connected with the current control sub-circuit.

In some embodiments of the present disclosure, the work control sub-circuit further includes a third control transistor. A first electrode of the third control transistor is connected with the output sub-circuit, and a second electrode of the third control transistor is connected with the to-be-driven element.

In some embodiments of the present disclosure, the output sub-circuit includes an output transistor. A first electrode of the output transistor is connected with the second electrode of the first control transistor, and a second electrode of the output transistor is connected with the first electrode of the third control transistor.

In some embodiments of the present disclosure, the pixel driving circuit further includes a reset sub-circuit. The reset sub-circuit includes a reset transistor, a gate electrode of the reset transistor is connected with a reset control line, a first electrode of the reset transistor is connected with a reset signal terminal, and a second electrode of the reset transistor is connected with at least one of the current control sub-circuit, the time length control sub-circuit and the to-be-driven element and configured to reset the current control sub-circuit, the time length control sub-circuit and the to-be-driven element.

At least one embodiment of the present disclosure provides a display device. The display device includes a to-be-driven element and the above pixel driving circuit. The pixel driving circuit is configured to provide signals for the to-be-driven element and the to-be-driven element is a current driven light emitting diode.

It should be understood that the above general descriptions and subsequent detailed descriptions are merely illustrative and explanatory rather than limiting of the present disclosure.

Figure 1:
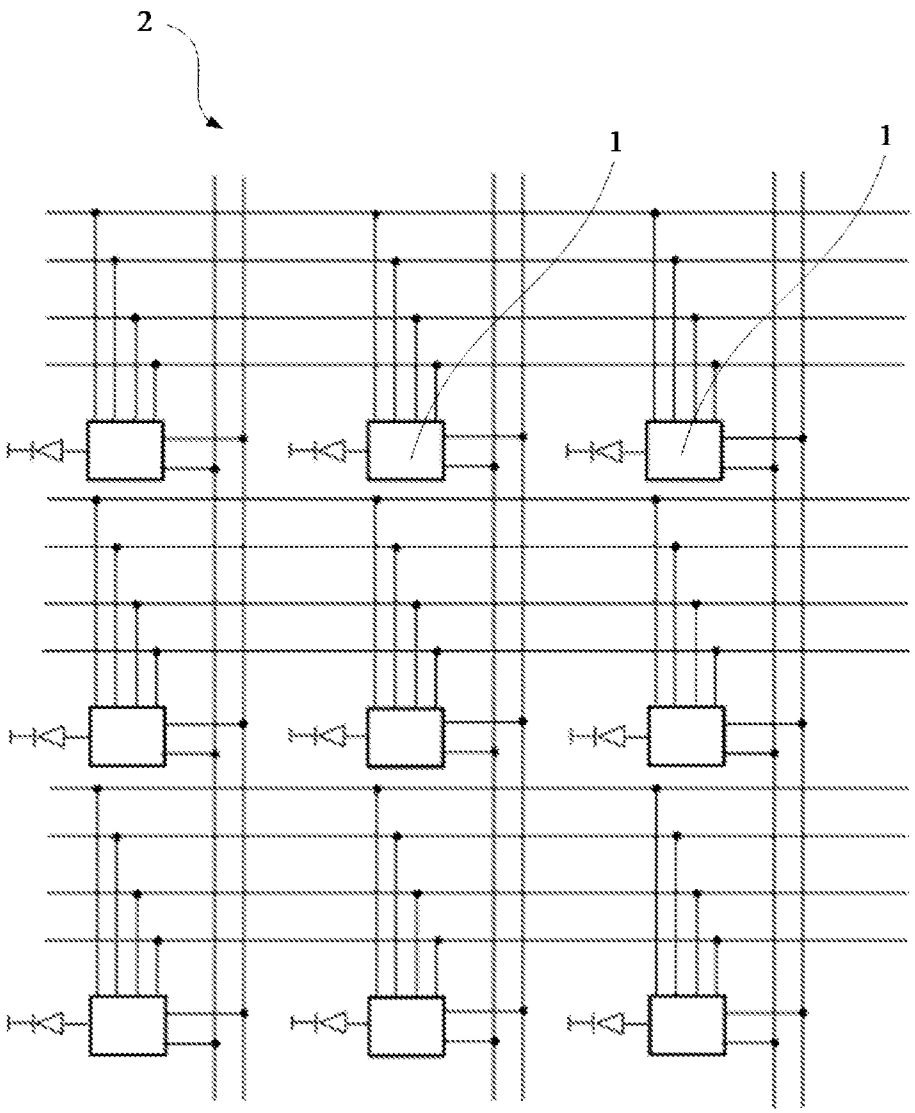
FIG. 1 is a diagram illustrating a pixel matrix according to an embodiment of the present disclosure.

Numerals of drawings are described below:

| | | |
|---|---|---|
| pixel 1 | display device 2 | pixel driving circuit 10 |
| time length signal line 11 | time signal Vdata_T | reference signal line 12 |
| reference voltage signal Vramp_T | data write control signal line 13 | data write |
| control signal Gate | | |
| current signal line 14 | current signal Vdata_I | work control signal line 15 |
| work control signal EM | reset control line 16 | reset control signal $R_{ST}$ |
| reset signal terminal 17 | reset voltage Vint | to-be-driven element 20 |
| rest stage S1 | data write stage S2 | light emission stage S3 |
| current control sub-circuit 100 | current write sub-circuit 110 | compensation sub-circuit |
| 120 | | |
| current write transistor T2 | compensation transistor T3 | first drive transistor T4 |
| current storage capacitor C1 | threshold voltage Vth | time length control |
| sub-circuit 200 | | |
| comparator 210 | non-inverting input terminal 211 | inverting input |
| terminal 212 | | |
| output terminal 213 | time length write sub-circuit 220 | reference voltage |
| write transistor T9 | | |
| time length write transistor T10 | time length storage capacitor C2 | output sub-circuit 300 |
| output transistor T7 | work control sub-circuit 400 | first control transistor |
| T6 | | |
| second control transistor T5 | third control transistor T8 | reset sub-circuit 500 |
| reset transistor T1 | power supply terminal VDD1 | |

Figure 2:
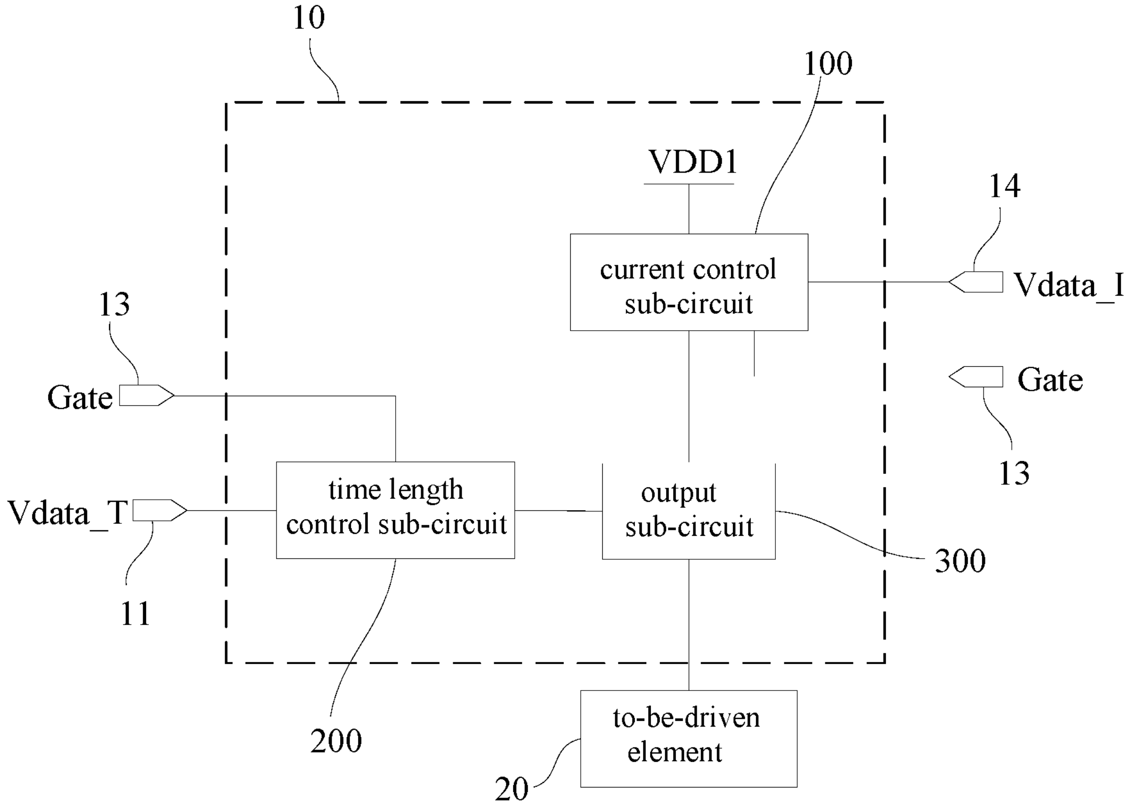

FIG. 2 is a block diagram illustrating a sub-circuit of a pixel driving circuit according to an embodiment of the present disclosure.

Figure 3:
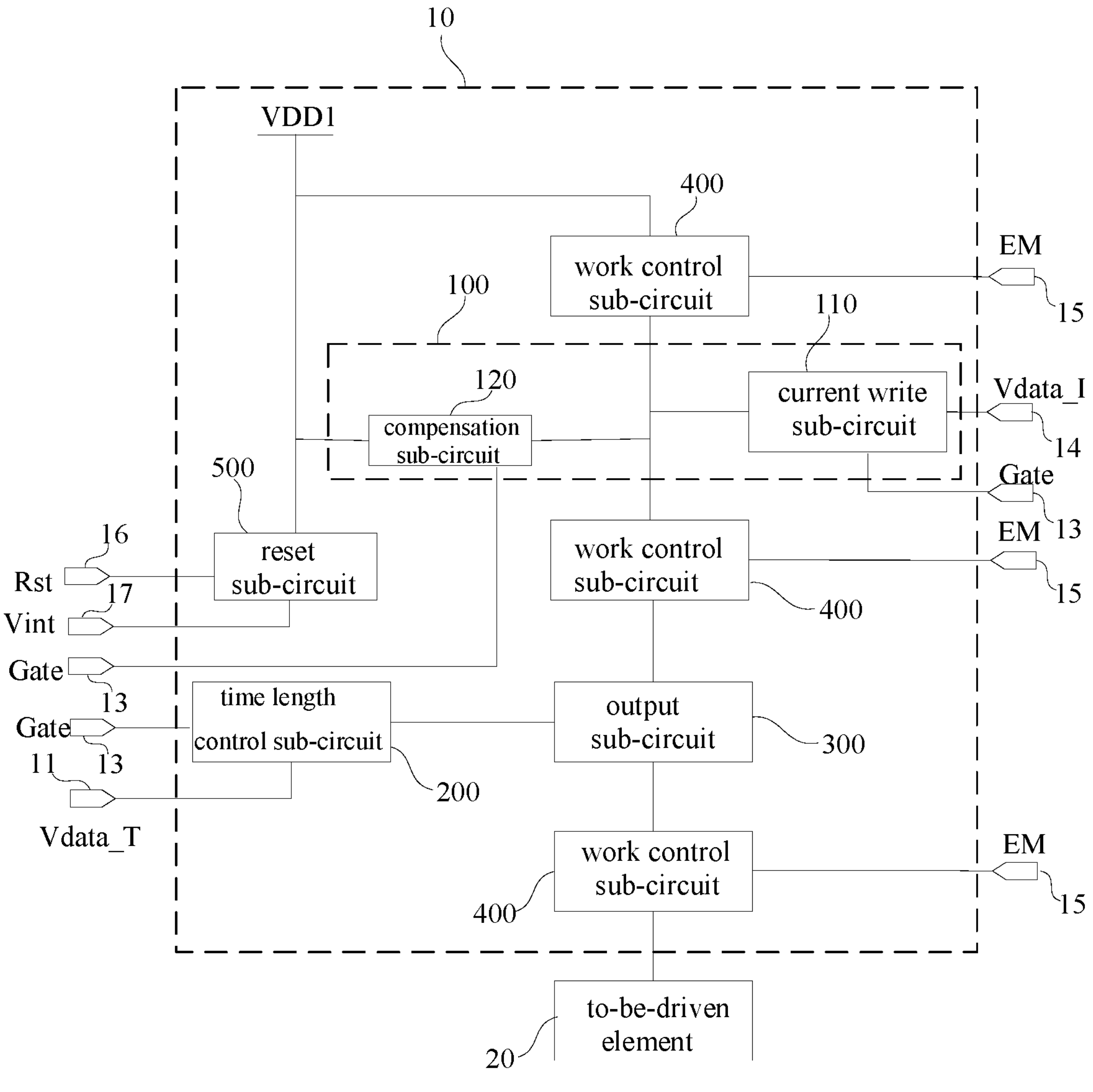

FIG. 3 is a circuit block diagram illustrating another pixel driving circuit according to an embodiment of the present disclosure.

Figure 4:
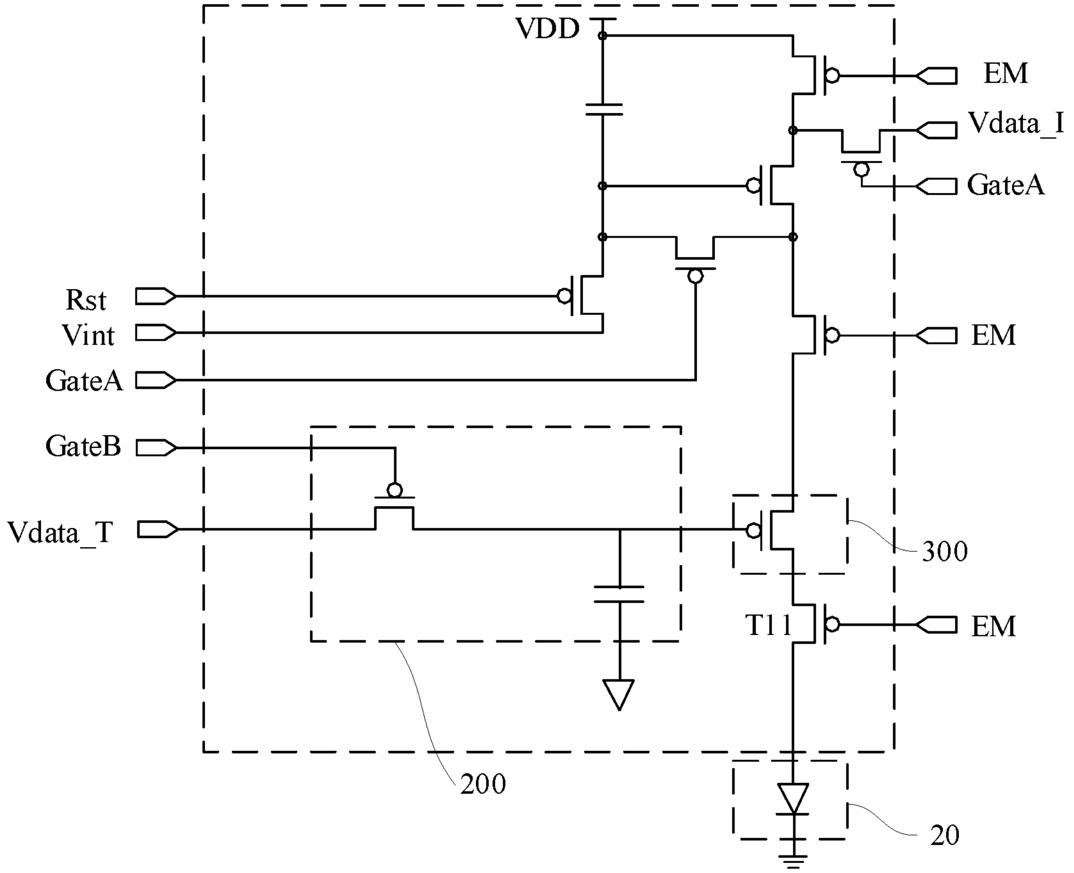
FIG. 4 (PRIOR ART)

FIG. 4 is a structural schematic diagram illustrating a pixel driving circuit known to the inventor.

Figure 5:
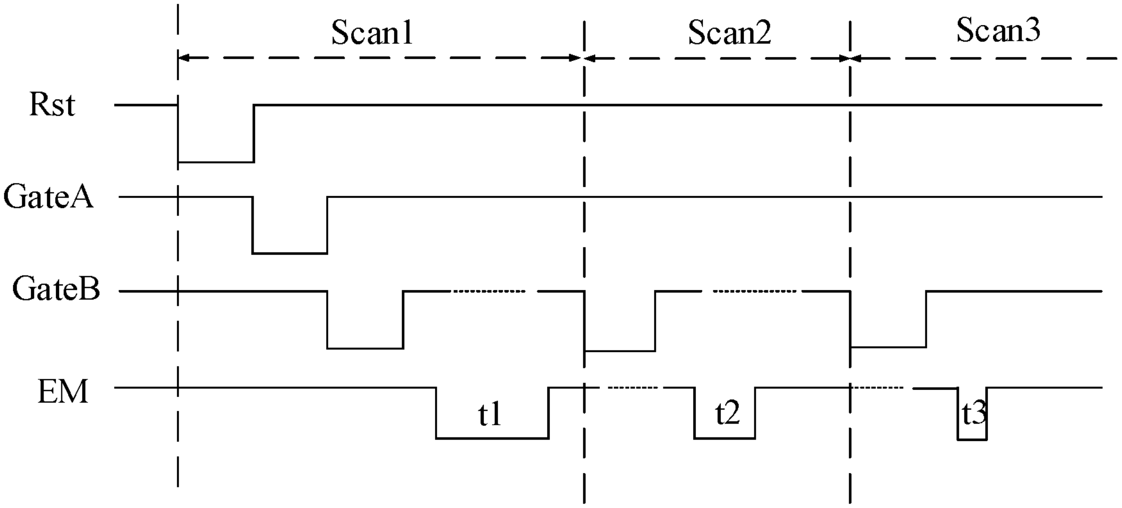
FIG. 5 (PRIOR ART)

FIG. 5 is a time sequence diagram of the pixel driving circuit shown in FIG. 4.

Figure 6:
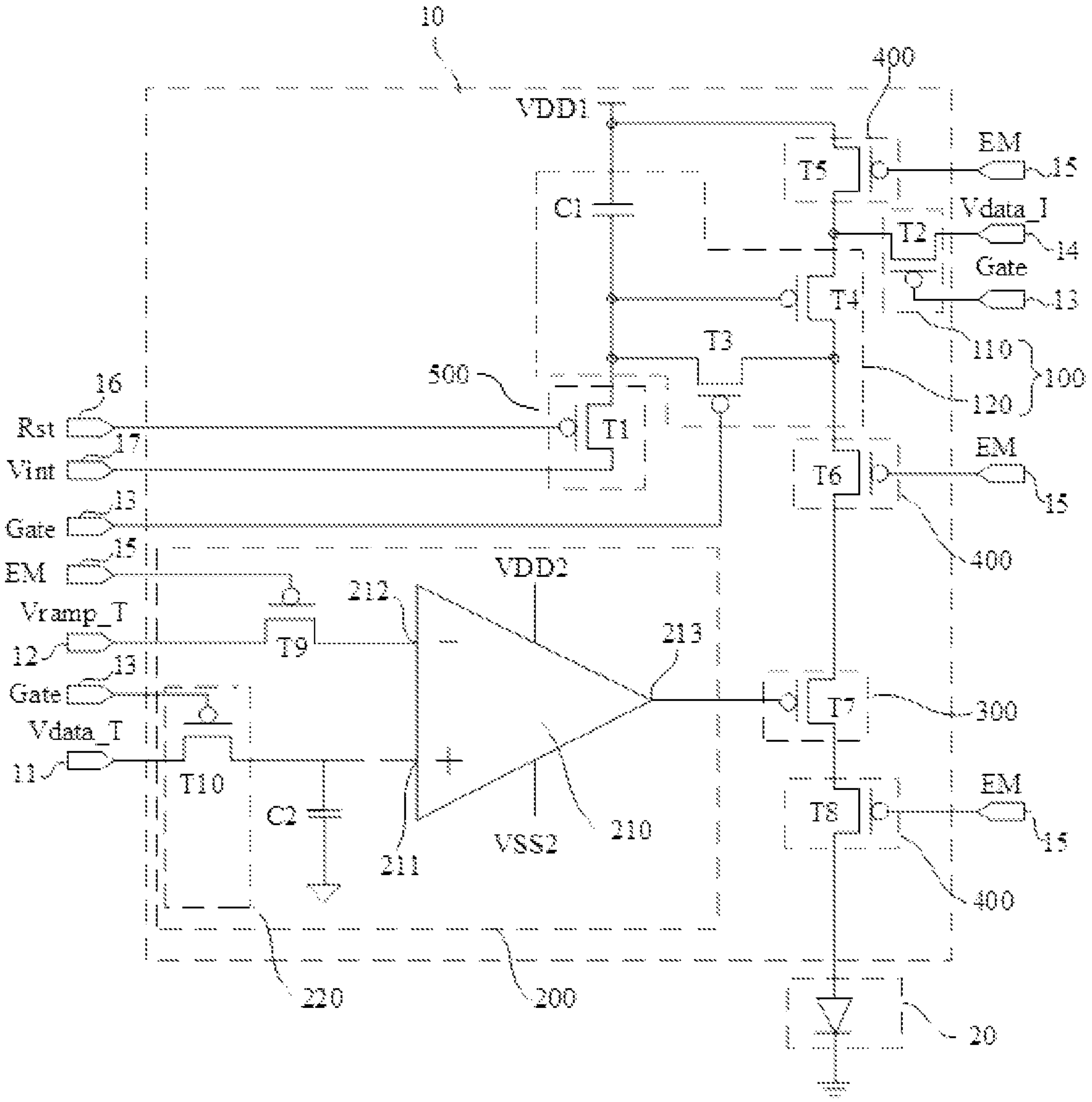

FIG. 6 is a schematic diagram illustrating a circuit structure according to an embodiment of the present disclosure.

Figure 7A:
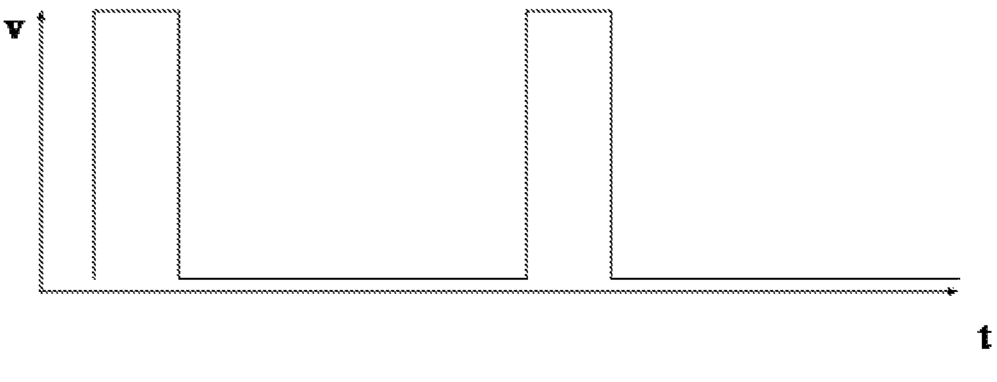
FIG. 7C is still another waveform diagram illustrating a comparison signal according to an embodiment of the present disclosure.

FIG. 7A is a waveform diagram illustrating a comparison signal according to an embodiment of the present disclosure.

Figure 7B:
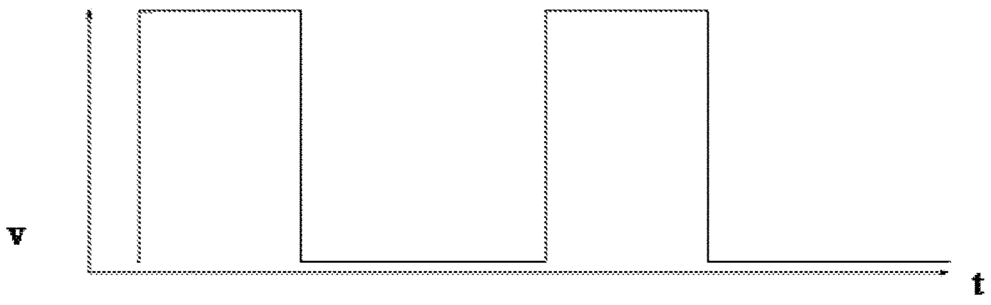

FIG. 7B is another waveform diagram illustrating a comparison signal according to an embodiment of the present disclosure.

DETAILED DESCRIPTION OF THE EMBODIMENTS

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular embodiments only, and are not intended to limit the present disclosure. Unless otherwise defined, technical terms or scientific terms used in the present disclosure should have general meanings that can be understood by ordinary persons of skill in the art. "One" or "a" and the like do not represent quantity limitation but represent at least one. "Multiple" represents two or more. Unless otherwise stated, "include" or "contain" or the like is intended to refer to that an element or object appearing before "include" or "contain" covers an element or object or its equivalents listed after "include" or "contain" and does not preclude other elements or objects. "Connect" or "connect with" or the like is not limited to physical or mechanical connection but includes direct or indirect electrical connection. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

At least one embodiment of the present disclosure provides a display device which is applied to an electronic apparatus having display function such as mobile phone, computer, tablet computer, electronic paper or wrist watch.

As shown in FIG. 1, a display device 2 includes a plurality of pixels 1 arranged in an array. The display device 2 drives a light emitting element of each pixel 1 to emit light so as to display an image. The light emitting elements of the display device 2 are taken as to-be-driven elements 20 and the to-be-driven elements 20 are current driven light emitting diodes, for example, micro light emitting diode (micro LED) or a miniature light emitting diode (mini LED), or an organic electroluminescent diode (OLED). In this case, a working time length of the to-be-driven element 20 referred to below may be understood as a light emission time length of the light emitting diode. The pixel 1 further includes a pixel driving circuit 10 which is connected with the to-be-driven element 20. The pixel driving circuit 10 is configured to provide a drive signal for the to-be-driven element 20 so as to control a current flowing through the to-be-driven element 20 in a process of displaying one frame of image and a total time length of power supply to the to-be-driven element 20 within time of one frame, thereby controlling its luminous intensity and light emission duration.

It is noted that the number of the pixels 1 in the display device 2 is very huge but FIG. 1 only illustrates a total of nine pixels 1 in three rows and three columns.

FIG. 4 is a schematic circuit diagram illustrating a pixel driving circuit known to the inventor. As shown in FIG. 4, the pixel driving circuit 10 further includes a communication transistor T11. A first terminal of the communication transistor T11 is connected with an output sub-circuit 300, a second terminal of the communication transistor T11 is connected with the to-be-driven element 20, and the communication transistor T11 is controlled by a separate work control signal EM. In a case that the work control signal EM is of high level, the communication transistor T11 is turned off; in a case that the work control signal EM is of low level, the communication transistor T11 is turned on. FIG. 5 is a time sequence diagram of FIG. 4. Usually, time of one frame is divided into several time periods, and FIG. 5 only shows three time periods, namely, Scan 1, Scan 2 and Scan 3. In the three time periods shown, sub-time periods in which the work control signal EM is of low level are $t_1$, $t_2$ and $t_3$, respectively, where lengths of $t_1$, $t_2$ and $t_3$ are different. A time length control sub-circuit 200 can only output one constant voltage signal in one time period, so as to control the output sub-circuit 300 to be turned on or off in the sub-time periods $t_1$, $t_2$ and $t_3$, and further determine the to-be-driven element 20 to emit light or not emit light in the sub-time periods $t_1$, $t_2$ and $t_3$. If time of one frame is divided into n time periods, each of the n time periods has a sub-time period in which the work control signal EM is of low level. For example, it is assumed that the sub-time period in which the work control signal EM is of low level in the first time period (Scan 1) is t1, and the sub-time period in which the work control signal EM is of low level in the n-th time period (Scan n) is $t_n$. The sub-time period in which the work control signal EM is of low level in each time period is different, namely, $t_1 \neq t_2 \ldots \neq t_n$. In the above design, the pixel driving circuit 10 can only control the to-be-driven element 20 to emit light or not emit light in the sub-time periods of $t_1$, $t_2$, $t_3$ to $t_n$, so as to determine a total light emission time length of the to-be-driven element 20 in the entire frame of time and further determine a brightness of the to-be-driven element 20 in the frame. However, because the light emission times of the to-be-driven element 20 in adjacent sub-time periods are different in time of one frame or one light emission time is very short, flicker will be observed with naked eyes. For example, if in any one frame, the to-be-driven element 20 needs to perform low-brightness displaying, because the total light emission time length of the light emitting diode in time of one frame is short, for example, the to-be-driven element 20 is lighted up only in the sub-time periods $t_1$ and $t_n$, and goes out in the sub-time periods $t_2$ to $t_{n-1}$, and the next frame follows this way to repeat like this, the light emission time distribution is not uniform, and the intervals of two adjacent light emission are relatively large and unequal, thereby bringing flicker phenomenon visible to naked eyes.

At the same time, in each time period, it is required to write data one time in the pixel driving circuit 10. In this case, it is required to write data several times in the pixel driving circuit 10 in time of one frame, occupying a large amount of time. If time of one frame contains n time periods, it is required to write data n times in the pixel driving circuit 10 in time of one frame. FIG. 5 only shows three time periods and thus data is written three times correspondingly. But, generally, time of one frame contains much more than three time periods. The display device is composed of multiple rows of pixels 1 and data are written row by row. Thus, if the display device is a high resolution display device, the number of the pixels 1 in the display device will be increased, the number of the corresponding rows will be increased and the data write time will be increased. Therefore, in time of one frame, the proportion of the data write time is excessively large, the time for the light emitting element in the pixel 1 to emit light will be shortened. Therefore, the above design cannot be applied to high resolution display.

At least one embodiment of the present disclosure provides a pixel driving circuit configured to provide a signal to to-be-driven elements. The pixel driving circuit includes a current control sub-circuit, configured to transmit a current signal; a time length control sub-circuit, configured to transmit a time signal; and an output sub-circuit, electrically connected with the time length control sub-circuit and the current control sub-circuit respectively. The time length control sub-circuit is further configured to control the output sub-circuit to be turned on or off based on the time signal; the output sub-circuit is configured to, when turned on, control a current applied to the to-be-driven element based on the current signal, where duration of two adjacent turn-ons of the output sub-circuit is same and duration of two adjacent turn-offs of the output sub-circuit is same.

As shown in FIGS. 2 and 3, the pixel driving circuit 10 according to one embodiment of the present disclosure includes a current control sub-circuit 100, a time length control sub-circuit 200 and an output sub-circuit 300. The current control sub-circuit 100 is configured to transmit a current signal Vdata_I. The time length control sub-circuit 200 is configured to transit a time signal Vdata_T. The output sub-circuit 300 is electrically connected with the time length control sub-circuit 200 and the current control sub-circuit 100, respectively.

The time length control sub-circuit 200 is further configured to control the output sub-circuit 300 to be turned on or off based on the time signal Vdata_T. The output sub-circuit 300 is configured to, when turned on, control a current flowing through the to-be-driven elements 20 based on the current signal Vdata_I. Duration of two adjacent turn-ons of the output sub-circuit 300 is same and duration of two adjacent turn-offs of the output sub-circuit 300 is same.

As shown in FIG. 2, in an embodiment of the present disclosure, the time length control sub-circuit 200 may directly control the output sub-circuit 300 to be turned on or off based on the time signal Vdata_T. In this case, it is not required to control the entire light emission time of the to-be-driven element 20 by using a work control signal. Further, duration of two adjacent turn-ons of the output sub-circuit 300 is same and duration of two adjacent turn-offs of the output sub-circuit 300 is same. In other words, the brightness that the to-be-driven element 20 needs to present in any one frame is converted into a time length in which the to-be-driven element 20 needs to be lighted up in this frame, and the time length is uniformly distributed to the time length of the entire frame. It is avoided that some adjacent two non-emission times are excessively short and other adjacent two non-emission times are excessively long. In this way, the flicker phenomenon visible to naked eyes generated by the to-be-driven element 20 during displaying will be mitigated or avoided, thus improving the experiences of the users.

Further, when the to-be-driven element 20 needs to be driven to emit light, in time of one frame, a number of turn-ons of the output sub-circuit 300 should be equal to or greater than 10. The number of turn-ons in time of one frame may be 12, 14, 15, 18, 20 and the like. As shown in FIGS. 4 and 5, in a case that a total light emission time length of the to-be-driven element 20 in time of one frame is very short, displaying is performed only in any one time period of t1, t2 . . . tn, namely, the number of turn-ons is only one, flicker phenomenon will be generated as well. Many experiments show that in time of one frame, when the number of turn-ons of the output sub-circuit 300 is equal to or greater than 10, the flicker visible to naked eyes can be mitigated or avoided.

Figure 13:
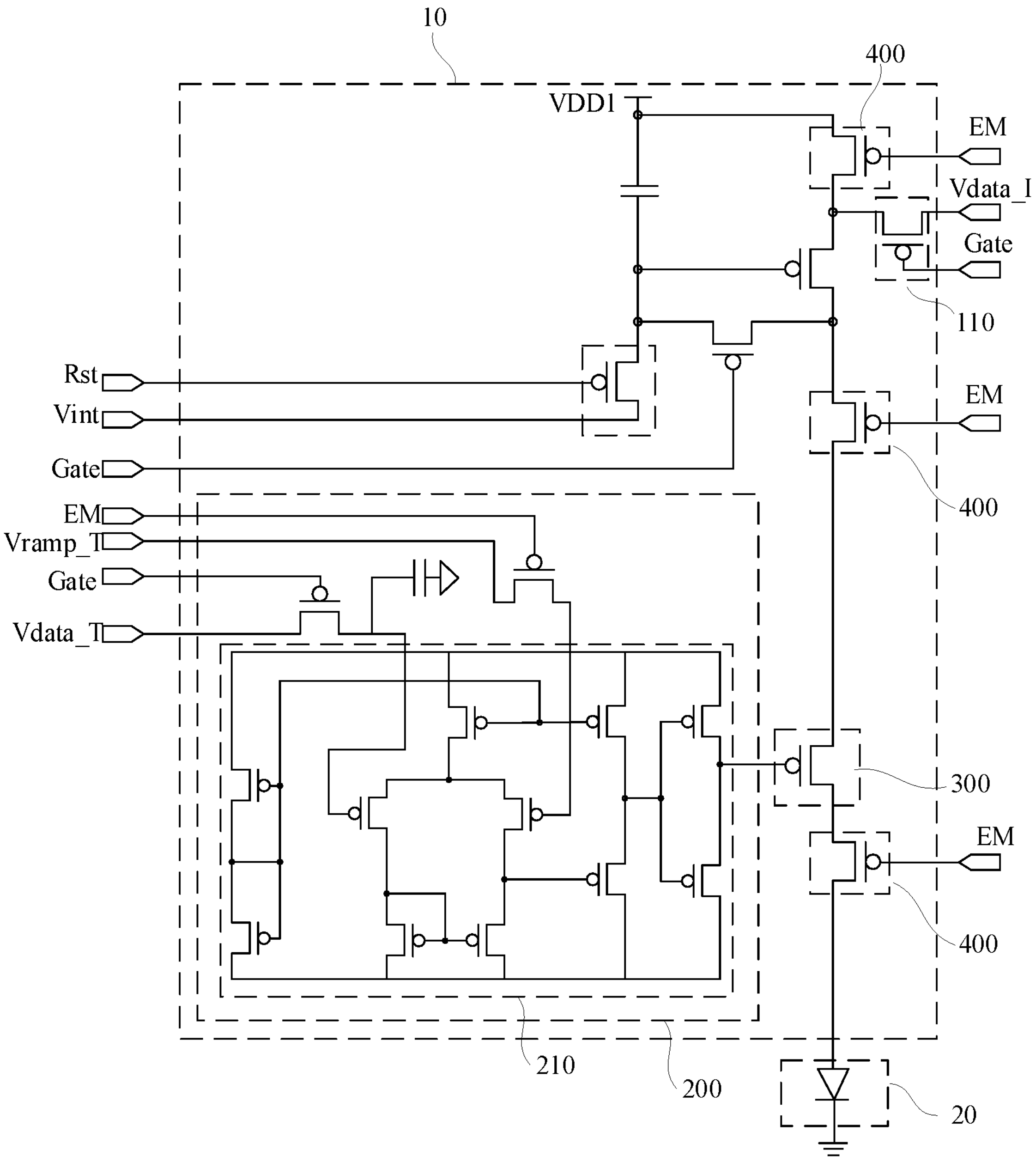
FIG. 13 is a specific structural diagram of the circuit structure shown in FIG. 6.

As shown in FIG. 6, the time length control sub-circuit 200 includes a comparator 210 including a non-inverting input terminal 211, an inverting input terminal 212 and an output terminal 213. The non-inverting input terminal 211 and the inverting input terminal 212 are respectively configured to receive the time signal Vdata_T and a reference voltage signal Vramp_T, and the output terminal 213 is connected with the output sub-circuit 300. The comparator 210 is configured to compare the time signal Vdata_T and the reference voltage signal Vramp_T and output a comparison signal through the output terminal 213. The comparator 210 is further configured to control the output sub-circuit 300 to be turned on or off based on the comparison signal. FIG. 13 shows, in more detail, the circuit structure shown in FIG. 6, where a connection relationship and an internal structure of the comparator 210 are shown.

In this embodiment, the non-inverting input terminal 211 is connected with a time length signal line 11 and configured to receive the time signal Vdata_T; the inverting input terminal 212 is connected with a reference signal line 12 and configured to receive the reference voltage signal Vramp_T. In this circuit structure, when the time signal Vdata_T is greater than the reference voltage signal Vramp_T, the comparator 210 outputs a comparison signal of low level, that is, the output terminal 213 transmits a comparison signal of low level to the output sub-circuit 300, and the output sub-circuit 300 is turned on. When the time signal Vdata_T is smaller than the reference voltage signal Vramp_T, the comparator 210 outputs a comparison signal of high level, that is, the output terminal 213 transmits a comparison signal of high level to the output sub-circuit 300, and the output sub-circuit 300 is turned off. Of course, in some embodiments of the present disclosure, the non-inverting input terminal 211 may be connected with the reference signal line 12 and configured to receive the reference voltage signal Vramp_T; the inverting input terminal 212 is connected with the time length signal line 11 and configured to receive the time signal Vdata_T. In this case, when the time signal Vdata_T is greater than the reference voltage signal Vramp_T, the comparator 210 outputs a comparison signal of high level; when the time signal Vdata_T is smaller than the reference voltage signal Vramp_T, the comparator 210 outputs a comparison signal of low level.

It is noted that the comparison signal is a periodic square wave signal. Only when the comparison signal is the periodic square wave signal, it can be ensured that the time lengths of two adjacent turn-ons of the output sub-circuit 300 are same and the time lengths of two adjacent turn-offs are same. In this way, it is ensured that the time lengths of two adjacent light emission of the to-be-driven element 20 in time of one frame are same and the time lengths of two adjacent non-lightings are same as well. Thus, the flicker phenomenon visible to naked eyes generated by the to-be-driven element 20 in time of one frame during displaying can be mitigated or avoided.

In combination with FIG. 1 as necessary, because the comparison signal is a periodic square wave signal, the to-be-driven elements 20 can be enabled to emit light or not emit light at intervals by performing one data write for one row of pixels 1 in time of one frame. By adjusting a duty cycle of the periodic square wave signal, the light emission time of the to-be-driven element 20 in time of one frame can be adjusted, that is, a display brightness of the to-be-driven element 20 in time of one frame can be adjusted. Therefore, by reducing the number of data writes, the time for data write in time of one frame can be reduced. Thus, the time for the to-be-driven element 20 to emit light will be increased. When the resolution of the display device is increased, the number of the pixels 1 will be increased and the corresponding rows will also be increased. In time of one frame, only one data write is performed for each row of pixels 1 and there will still be sufficient time for each pixel 1 to display. As a result, the display device according to the embodiments of the present disclosure can perform high resolution display.

Figure 7C:
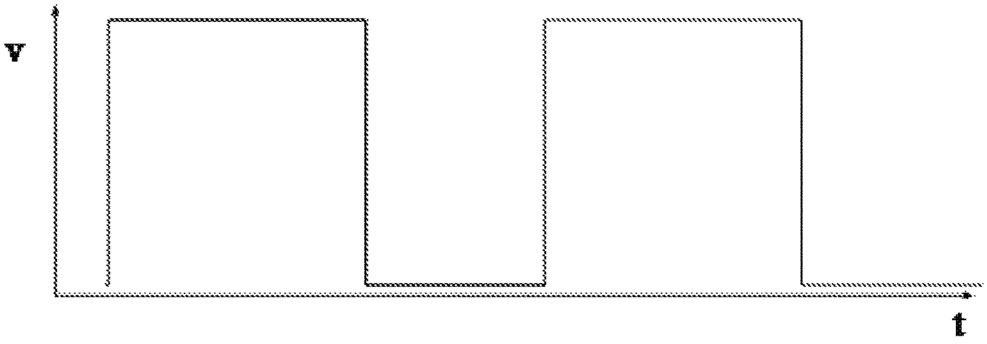
Figure 14A:
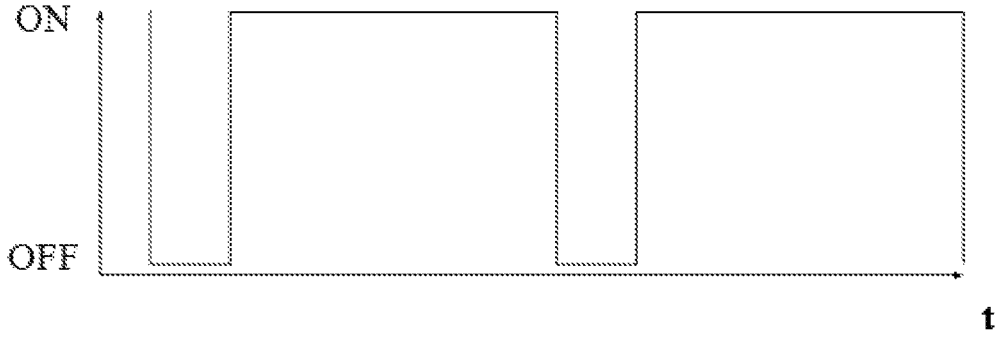
FIGS. 14A-14C illustrate time durations in which the output sub-circuit and thus the to-be-driven element is turned on and off with time according to some embodiments of the present disclosure.
Figure 14B:
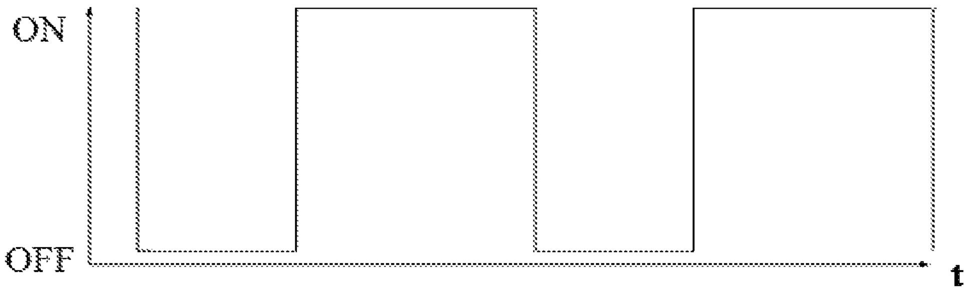
Figure 14C:
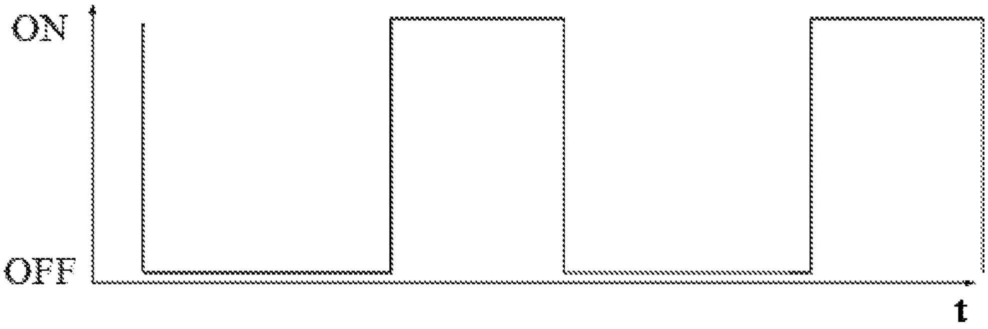

In one embodiment of the present disclosure, the time signal Vdata_T obtained by the comparator 210 is a fixed voltage value in time of one frame, and the reference voltage signal Vramp_T is a ramp signal. By the above disposal, it can be ensured that the comparison signal output by the comparator 210 is a periodic square wave signal. In an actual use, by adjusting a magnitude of the time signal Vdata_T, the comparison signals (i.e. periodic square wave signals) of different duty cycles can be obtained (refer to FIGS. 7A-7C). For example, if the voltage value of the time signal Vdata_T is large, the comparison signal is as shown in FIG. 7A. In time of one frame, the total light emission time length of the to-be-driven element 20 is long as shown in FIG. 14A. At this time, the brightness of the to-be-driven element 20 is high. If the voltage value of the time signal Vdata_T is small, the comparison signal is as shown in FIG. 7B/7C. In time of one frame, the total light emission time length of the to-be-driven element 20 is short as shown in FIG. 14B/14C, and the brightness of the to-be-driven element 20 is low.

Of course, in some embodiments of the present disclosure, the reference voltage signal Vramp_T may also be a triangle wave signal, a sawtooth wave signal, a sine wave signal or a cosine wave signal or the like.

In combination with FIG. 1, a plurality of pixels 1 in the display device 2 are arranged in an array. In one embodiment of the present disclosure, a frequency of the reference voltage signal Vramp_T is relatively low. To guarantee the voltage values corresponding to the reference voltage signals Vramp_T received by each row of pixels 1 are same, generally, after data write is performed for all rows of pixels 1, the reference voltage signal Vramp_T is written. Because it takes some time to perform data write for each row of pixels 1, the displaying of front rows of pixels 1 will be lagged. For example, if the display device 2 has n rows of pixels 1, after data for the first row of pixels 1 is written and registered, the reference voltage signal Vramp_T is written only after data write is performed for the n-th row of pixels 1. Then the registered time signal Vdata_T and the reference voltage signal Vramp_T are compared to finally determine the light emission of each pixel 1. In this case, displaying time is also wasted, which is not helpful to high resolution display.

Furthermore, the reference voltage signal Vramp_T is a high frequency signal. In an embodiment of the present disclosure, the reference voltage signal Vramp_T is a high frequency ramp signal. A frequency of the reference voltage signal Vramp_T is equal to or greater than 750 Hz and equal to or smaller than 7500 Hz. In the above disposal, by limiting the frequency of the reference voltage signal Vramp_T, the reference voltage signal Vramp_T is maintained to change at high frequency. In an embodiment of the present disclosure, the frequency of the reference voltage signal Vramp_T is 800 Hz. Of course, in some embodiments of the present disclosure, the frequency of the reference voltage signal Vramp_T may also be 900 Hz, 1000 Hz, 1500 Hz, 2000 Hz, 3000 Hz, 4000 Hz, 4500 Hz, 5000 Hz, 6000 Hz, 7000 Hz, or any frequency within the range equal to or greater than 750 Hz and equal to or smaller than 7500 Hz. No matter when the reference voltage signal Vramp_T is input, the duty cycle of the comparison signal obtained by comparing the reference voltage signal Vramp_T and the time signal Vdata_T through the comparator 210 is relatively stable. In other words, in time of one frame, the light emission time length of the to-be-driven element 20 will not change due to different times in which the reference voltage signal Vramp_T is input, thus ensuring the brightness of the to-be-driven element 20 is identical to a preset brightness. In this case, when the display device performs displaying, after data is written and registered in a row of pixels, the registered time signal Vdata_T and the reference voltage signal Vramp_T can be directly compared so that the row of pixels can directly emit light without awaiting the last row of pixels to be data-written. With the above disposal, lagged displaying may be avoided or mitigated, which is helpful to achieve high resolution display of the display device.

In an embodiment of the present disclosure, as shown in FIGS. 3 and 6, the time length control sub-circuit 200 further includes a time length write sub-circuit 220 and a time length storage capacitor C2. A first terminal of the time length write sub-circuit 220 is connected with the time length signal line 11 and a second terminal of the time length write sub-circuit 220 is connected with the non-inverting input terminal 211 of the comparator 210. A first terminal of the time length storage capacitor C2 is connected with the second terminal of the time length write sub-circuit 220 and the non-inverting input terminal 211 of the comparator 210, and a second terminal of the time length storage capacitor C2 is grounded. Of course, in some embodiments of the present disclosure, the time length write sub-circuit 220 may alternatively be connected with the inverting input terminal 212 of the comparator 210. At this time, the first terminal of the time length storage capacitor C2 is connected with the second terminal of the time length write sub-circuit 220 and the inverting input terminal 212 of the comparator 210, and the second terminal of the time length storage capacitor C2 is grounded. In the above disposal, the time signal Vdata_T is registered using the time length storage capacitor C2, such that in time of one frame, the non-inverting input terminal 211 of the comparator 210 can obtain the time signal Vdata_T of stable voltage. In an embodiment of the present disclosure, the time length write sub-circuit 220 includes a time length write transistor T10. A first electrode of the time length write transistor T10 is connected with the time length signal line 11, a second electrode of the time length write transistor T10 is connected with the non-inverting input terminal 211 of the comparator 210, and a gate electrode of the time length write transistor T is connected with a data write control signal line 13. The data write control signal line 13 inputs a data write control signal Gate to the gate electrode. When the data write control signal Gate is of low level, the time length write transistor T10 is turned on, and the time signal Vdata_T is stored in the time length storage capacitor C2 connected with the non-inverting input terminal 211 through the time length write transistor T10. When the data write control signal Gate is of high level, the time length write transistor T10 is turned off.

In an embodiment of the present disclosure, the time length control sub-circuit 200 further includes a reference voltage write transistor T9. The reference signal line 12 is connected with the comparator 210 through the reference voltage write transistor T9. A first electrode of the reference voltage write transistor T9 is connected with the reference signal line 12, a second electrode of the reference voltage write transistor T9 is connected with the inverting input terminal 212 of the comparator 210, and a gate electrode of the reference voltage write transistor T9 is connected with the work control signal line 15. The work control signal line 15 writes the work control signal EM into the reference voltage write transistor T9. When the work control signal EM is of low level, the reference voltage write transistor T9 is turned on to input the reference voltage signal Vramp_T to the inverting input terminal 212 of the comparator 210. When the work control signal EM is of high level, the reference voltage write transistor T9 is turned off.

With continued reference to FIGS. 3 and 6, in an embodiment of the present disclosure, the current control sub-circuit 100 includes a current write sub-circuit 110 and a compensation sub-circuit 120. The current write sub-circuit 110 includes a current write transistor T2. The compensation sub-circuit 120 includes a compensation transistor T3, a current storage capacitor C1 and a first drive transistor T4. The compensation sub-circuit 120 is connected with the current write sub-circuit 110 and the output sub-circuit 300. A first electrode of the first drive transistor T4 is connected with the current write sub-circuit 110, a second electrode of the first drive transistor T4 is connected with a first electrode of the compensation transistor T3, a gate electrode of the first drive transistor T4 and a second electrode of the compensation transistor T3 are both connected with the current storage capacitor C1 and connected with a power supply terminal VDD1 through the current storage capacitor C1, and a gate electrode of the compensation transistor T3 is connected with the data write control signal line 13. A first electrode of the current write transistor T2 is connected with a current signal line 14, a second electrode of the current write transistor T2 is connected with the first electrode of the first drive transistor T4 in the compensation sub-circuit 120, and a gate electrode of the current write transistor T2 is connected with the data write control signal line 13.

The current write transistor T2, the time length write transistor T10 and the compensation transistor T3 are all controlled to be turned on or off by the data write control signal line 13. When the data write control signal Gate output by the data write control signal line 13 is of low level, the current write transistor T2, the time length write transistor T10 and the compensation transistor T3 are all turned on. When the data write control signal Gate output by the data write control signal line 13 is of high level, the current write transistor T2, the time length write transistor T10 and the compensation transistor T3 are all turned off.

When the current write transistor T2 is turned on, the current signal Vdata_I is written into the first electrode of the first drive transistor T4 through the current write transistor T2. Due to the characteristics of the first drive transistor T4, when a potential of the gate electrode of the first drive transistor T4 is lower than a potential of its first electrode, the first drive transistor T4 is turned on and the current signal Vdata_I charges the current storage capacitor C1 through the first drive transistor T4 and the compensation transistor T3. In this way, the current storage capacitor C1 stores the current signal Vdata_I. The voltage on the first electrode of the first drive transistor T4 is maintained as Vdata_I and the voltage on the gate electrode of the first drive transistor T4 is increasing. When the voltage on the gate electrode of the first drive transistor T4 is Vdata+Vth, the first drive transistor T4 is turned off, where Vdata represents a voltage of the current signal Vdata_I and Vth represents a threshold voltage of the first drive transistor T4.

As shown in FIG. 6, the compensation sub-circuit 120 is used to not only store the current signal Vdata_I input by the current write sub-circuit 110 but also store the threshold voltage Vth of the first drive transistor T4.

With continued reference to FIG. 6, the current storage capacitor C1 is connected with the gate electrode of the first drive transistor T4, and the compensation transistor T3 is connected with the second electrode of the first drive transistor T4. Under the control of the data write control signal Gate, the current storage capacitor C1 stores the threshold voltage Vth and the current signal Vdata_I of the first drive transistor T4. In one frame of light emission time period, the threshold voltage Vth signal stored in the current storage capacitor C1 may compensate the first drive transistor T4, such that the current output by the first drive transistor T4 is only related to the current signal Vdata_I and free from the influence of the first drive transistor T4, thereby improving the accuracy of the output drive current. The pixel driving circuit 10 further includes the power supply terminal VDD1. When the current control sub-circuit 100 is turned on, namely, the current control sub-circuit 100 is in communication with the power supply terminal VDD1 and the data write control signal Gate is of low level, the compensation transistor T3, the current write transistor T2 and the first drive transistor T4 are all turned on. The working current generated and applied by the first drive transistor T4 to the to-be-driven element 20 is expressed as follows:

$$
\begin{aligned}
I_{DS} &= \frac{1}{2}\mu C_{ox}\frac{W}{L}(V_{GS}-Vth)^2\\
&= \frac{1}{2}\mu C_{ox}\frac{W}{L}(Vdata+Vth-VDD-Vth)^2\\
&= \frac{1}{2}\mu C_{ox}\frac{W}{L}(Vdata-VDD)^2
\end{aligned}
$$

It is noted that μ is an electron mobility, $C_{ox}$ is a capacitance of gate oxide layer, $V_{GS}$ is a voltage of the gate electrode relative to a source electrode, and $$\frac{W}{L}$$

is a width-length ratio of the first drive transistor T4.

The working current generated and applied to the to-be-driven element 20 by the first drive transistor T4 can directly determine a luminous intensity of the to-be-driven element 20. According to the formula, the magnitude of the working current is irrelevant to the threshold voltage Vth of the first drive transistor T4 but relevant to the current signal Vdata_I and the characteristics (μ, $C_{ox}$ and $V_{GS}$) of the first drive transistor T4. Due to the characteristics of the to-be-driven element 20, such as a micro LED and a mini LED, its light emission efficiency, brightness of emitted rays and color coordinate may change along with change of a current density under a low current density, further leading to displaying quality problem. Because a current of large current density can drive the to-be-driven element 20 to emit stable light, to ensure the light emission efficiency, the current of large current density may be used to drive the to-be-driven element 20 to emit light so as to display an image. The current generated by the first drive transistor T4 should enable the to-be-driven element 20 to work in a high current density region to avoid the problems of drift of a main wave peak along with the change of the current density, poor brightness uniformity under the low current density and the like. It is known from experiments that when the width-length ratio of the first drive transistor T4 is greater than 3, the brightness displayed by the to-be-driven element 20 has good uniformity. In an embodiment of the present disclosure, the width-length ratio of the first drive transistor T4 is 4. Of course, in some embodiments of the present disclosure, the width-length ratio of the first drive transistor T4 may alternatively be any value greater than 3, for example, 5, 6, 7, 8, 9.1 or the like.

Further, as shown in FIGS. 3 and 6, in an embodiment of the present disclosure, the pixel driving circuit 10 further includes a work control sub-circuit 400. The work control sub-circuit 400 includes a first control transistor T6, a second control transistor T5 and a third control transistor T8. Gate electrodes of the first control transistor T6, the second control transistor T5 and the third control transistor T8 are all connected with the work control signal line 15. The work control signal line 15 is configured to transmit the work control signal EM to the first control transistor T6, the second control transistor T5 and the third control transistor T8 respectively, so as to control the first control transistor T6, the second control transistor T5 and the third control transistor T8 to be turned on or off.

A first electrode of the first control transistor T6 is connected with the current control sub-circuit 100; a second electrode of the first control transistor T6 is connected with the output sub-circuit 300. The first control transistor T6 is configured to, when turned on, transmit the current signal Vdata_I to the output sub-circuit 300. By disposing the first control transistor T6, relative independence of the current control sub-circuit 100 and the time length control sub-circuit 200 is guaranteed, thus avoiding mutual influence of both.

A first electrode of the second control transistor T5 is connected with the power supply terminal VDD1, and a second electrode of the second control transistor T5 is connected with the current write transistor T2 in the current write sub-circuit 110. When the work control signal EM is of low level, the second control transistor T5 is turned on, and the power supply terminal VDD1 is in communication with the second electrode of the current write transistor T2. By disposing the second control transistor T5, a voltage can be provided to the current control sub-circuit 100.

A first electrode of the third control transistor T8 is connected with the output sub-circuit 300 and a second electrode of the third control transistor T8 is connected with the to-be-driven element 20. When the work control signal EM is of low level, the third control transistor T8 is turned on and the third control transistor T8 is configured to supply power to the to-be-driven element 20, namely, the current signal Vdata_I and the time signal Vdata_T are transmitted to the to-be-driven element 20. In this way, the current and the light emission time length of the to-be-driven element 20 in time of one frame are determined and thus the luminous intensity and the light emission time of the to-be-driven element 20 are determined, namely, the displaying brightness of the to-be-driven element in the time of the frame is determined.

In an embodiment of the present disclosure, the output sub-circuit 300 includes an output transistor T7. A first electrode of the output transistor T7 is connected with the current control sub-circuit 100 through the first control transistor T6, and a second electrode of the output transistor T7 is connected with the to-be-driven element 20 through the third control transistor T8. A gate electrode of the output transistor T7 is connected with the output terminal 213 of the comparator 210 in the time length control sub-circuit 200.

Further, with continued reference to FIGS. 3 and 6, in an embodiment of the present disclosure, the pixel driving circuit 10 further includes a reset sub-circuit 500. The reset sub-circuit 500 is connected with the current control sub-circuit 100 and configured to reset the current control sub-circuit 100. In other embodiments of the present disclosure, the reset sub-circuit 500 may also be connected with the time length control sub-circuit 200 and/or the to-be-driven element 20. In this case, the reset sub-circuit 500 is configured to reset the time length control sub-circuit 200 and the displaying brightness of the to-be-driven element 20. In an embodiment of the present disclosure, the reset sub-circuit 500 includes a reset transistor T1. A gate electrode of the reset transistor T1 is connected with a reset control line 16; a first electrode of the reset transistor T1 is connected with a reset signal terminal 17 to be input with a reset voltage Vint through the reset signal terminal 17. A second electrode of the reset transistor T1 is connected with the current storage capacitor C1 and the second electrode of the compensation transistor T3. When a reset control signal Rst output by the reset control line 16 is of high level, the reset transistor T1 is turned off. When the reset control signal Rst output by the reset control line 16 is of low level, the reset transistor T1 is turned on, and the reset voltage Vint is stored in the current storage capacitor C1. In the above manner, the current storage capacitor C1 and the gate electrode of the first drive transistor T4 can be reset, namely, the current control sub-circuit 100 is reset, so as to eliminate the influence of the residual current data signal Vdata_I from the previous frame on the current frame. In some embodiments of the present disclosure, the reset sub-circuit 500 is also connected with the time length control sub-circuit 200 and/or the to-be-driven element 20. At this time, the second electrode of the reset transistor T1 is connected with the time length storage capacitor C2 and/or the to-be-driven element 20. Of course, another reset transistor may also be added.

Figure 8:
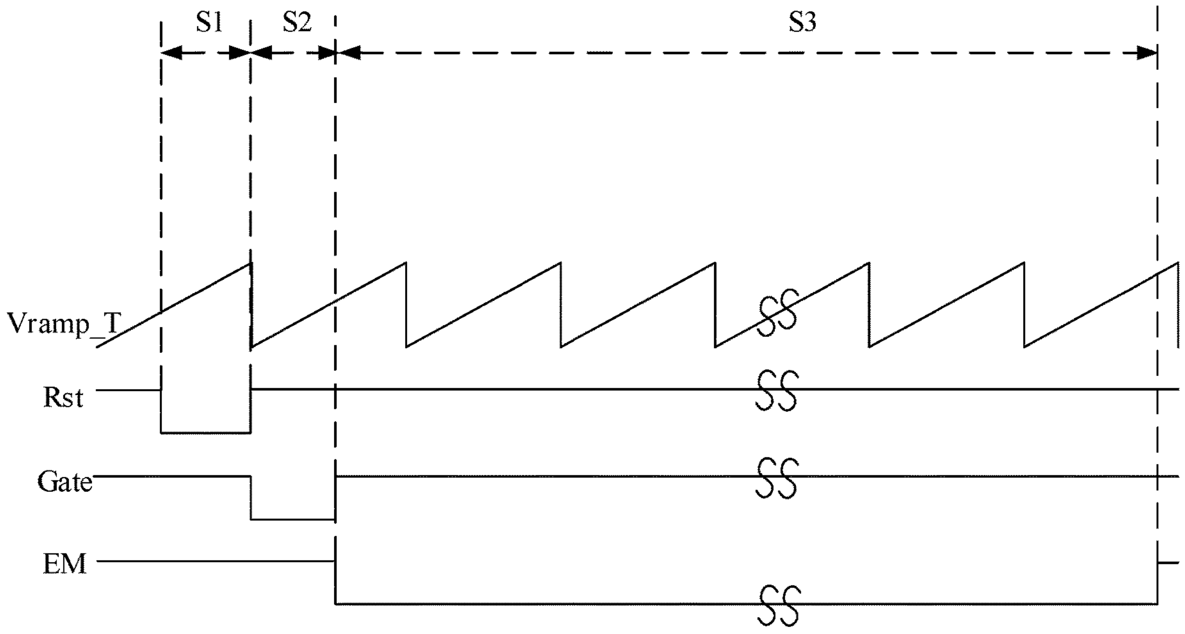
FIG. 8 is a time sequence diagram of the pixel driving circuit shown in FIG. 6.

FIG. 8 is a time sequence diagram of the pixel driving circuit 10 shown in FIG. 6, which is a signal sequence diagram of the pixel driving circuit 10 of one row of pixels in one frame period. According to FIG. 8, it can be known that the pixel driving circuit 10 needs to go through a reset stage S1, a data write stage S2 and a light emission stage S3 in one frame period.

Figure 9:
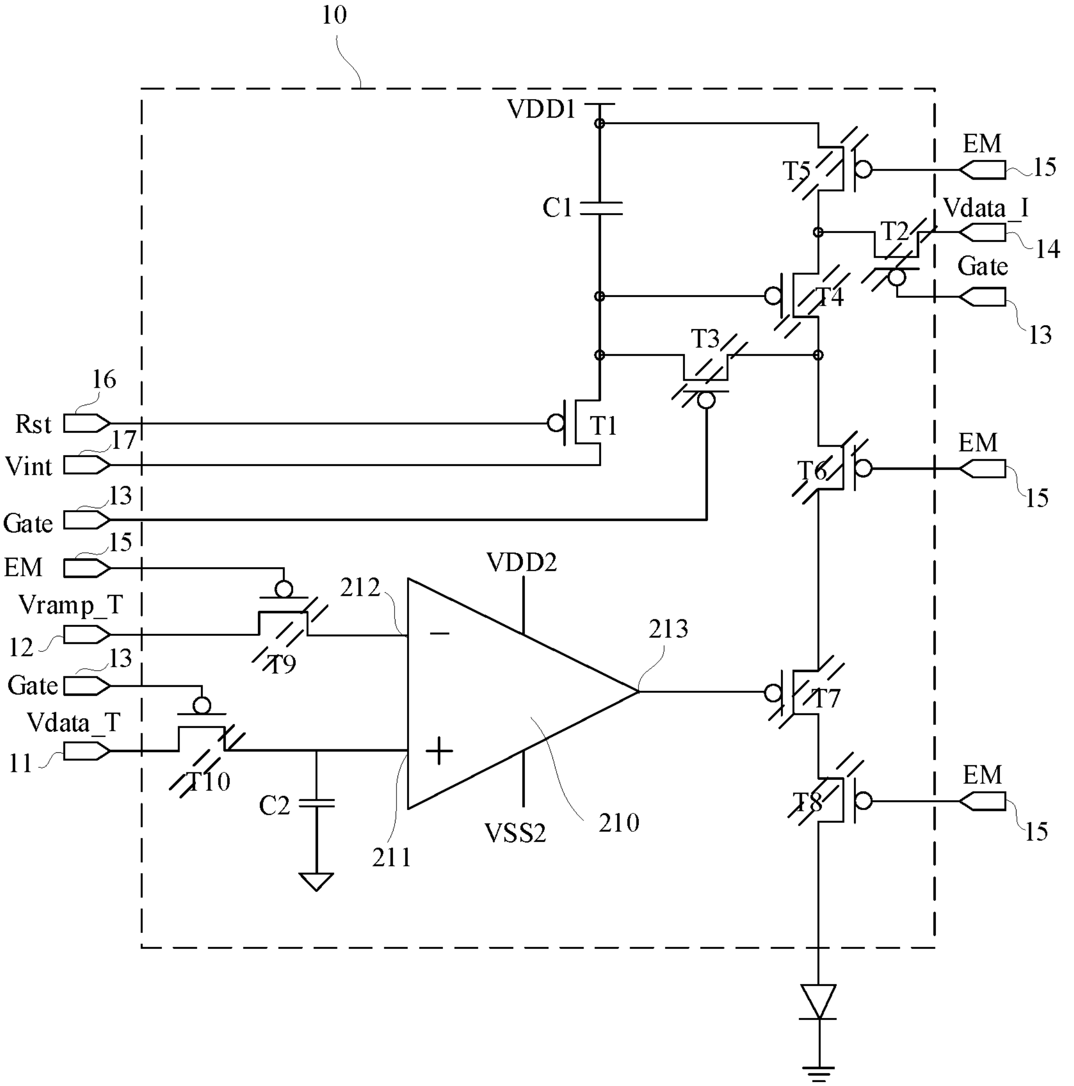
FIG. 9 is a schematic diagram illustrating a circuit structure according to another embodiment of the present disclosure.

As shown in FIGS. 8 and 9, in the reset stage S1, only the reset control signal Rst output by the reset control line 16 is of low level, the reset transistor T1 is turned on, and all other transistors are turned off. At this time, the pixel driving circuit 10 initializes the current storage capacitor C1, such that the potentials at both ends of the current storage capacitor C1 are the power supply terminal VDD1 and the reset voltage Vint respectively. At the same time, the reset voltage Vint is applied to the gate electrode of the first drive transistor T4 and the second electrode of the compensation transistor T3 to eliminate the residual current signal Vdata_I from the previous frame, thereby improving the displaying accuracy of the current frame period.

It is noted that the reset voltage Vint may be a voltage of low potential, for example, grounded. In FIG. 9, the transistors marked with parallel oblique dashed lines are in a turned-off state and the transistor not marked with parallel oblique dashed lines is in a turned-on state.

Figure 10:
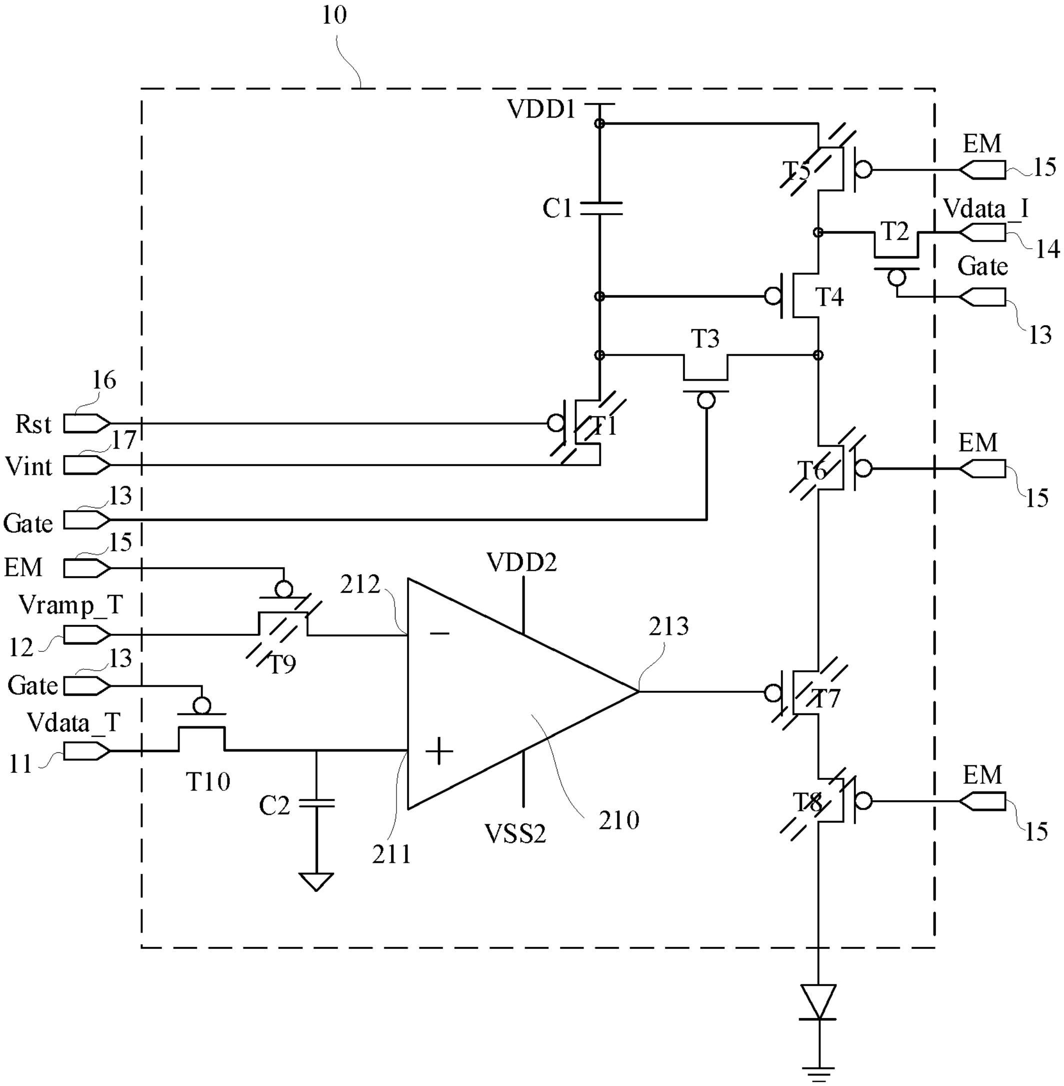
FIG. 10 is a schematic diagram illustrating a circuit structure according to still another embodiment of the present disclosure.

As shown in FIGS. 8 and 10, in the data write stage S2, only the data write control signal Gate is of low level. The current write transistor T2, the time length write transistor T10 and the compensation transistor T3 are turned on. Further, because the voltage of the gate electrode of the first drive transistor T4 is smaller than a sum of the voltage of the first electrode and the threshold voltage Vth, the first drive transistor T4 is also in a turned-on state. All other transistors are in a turned-off state. At this time, the current signal Vdata_I is written through the current write transistor T2, the first drive transistor T4 is in a saturated turned-on state and the voltage of its gate electrode is changed to Vdata+Vth. The voltage is stored and maintained by the current storage capacitor C1. The time signal Vdata_T is written through the time length write transistor T10, the time signal Vdata_T is stored and maintained by the time length storage capacitor C2 and input into the non-inverting input terminal 211 of the comparator 210 at the same time.

It is noted that, in FIG. 10, the transistors marked with parallel oblique dashed lines are in a turned-off state and the transistors not marked with parallel oblique dashed lines are in a turned-on state.

Figure 11:
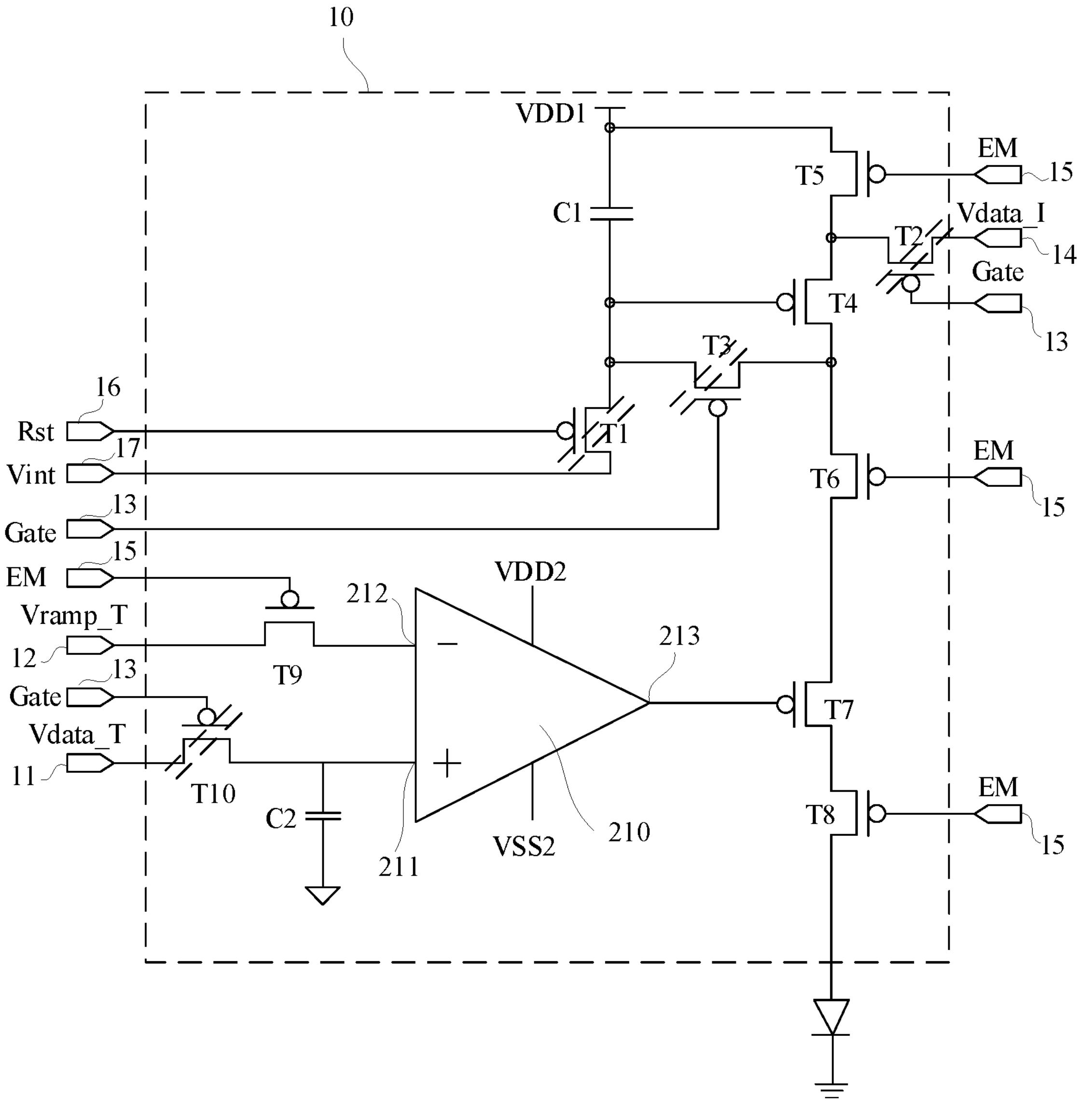
FIG. 11 is a schematic diagram illustrating a circuit structure according to yet another embodiment of the present disclosure.

As shown in FIGS. 8 and 11, referring to FIG. 6 as necessary, in the light emission stage S3, only the work control signal EM is of low level. The first drive transistor T4, the reference voltage write transistor T9, the first control transistor T6, the second control transistor T5 and the third control transistor T8 are all turned on. The current control sub-circuit 100 generates the working current of the to-be-driven element 20, namely, generates a working current irrelevant to the threshold voltage Vth of the first drive transistor T4. In the time length control sub-circuit 200, the inverting input terminal 212 of the comparator 210 is input with the reference voltage signal Vramp_T of high frequency ramp, and the non-inverting input terminal 211 of the comparator 210 is input with the time signal Vdata_T stored in the time length storage capacitor C2. When the reference voltage signal Vramp_T>time signal Vdata_T, the output terminal 213 of the comparator 210 outputs the high level VDD2, and at this time, the output transistor T7 is turned off, and the to-be-driven element 20 does not emit light. When the reference voltage signal Vramp_T<the time signal Vdata_T, the output terminal 213 of the comparator 210 outputs the low level VSS2, and at this time, the output transistor T7 is turned on and the to-be-driven element 20 emits light.

It is noted that, in FIG. 11, the transistors marked with parallel oblique dashed lines are in a turned-off state, and the transistors not marked with double oblique dashed lines are in a turned-on state. The state of the output transistor T7 in FIG. 11 is controlled by the output signal of the output terminal 213 of the comparator 210, and is not marked in a turned-off state.

Figure 12:
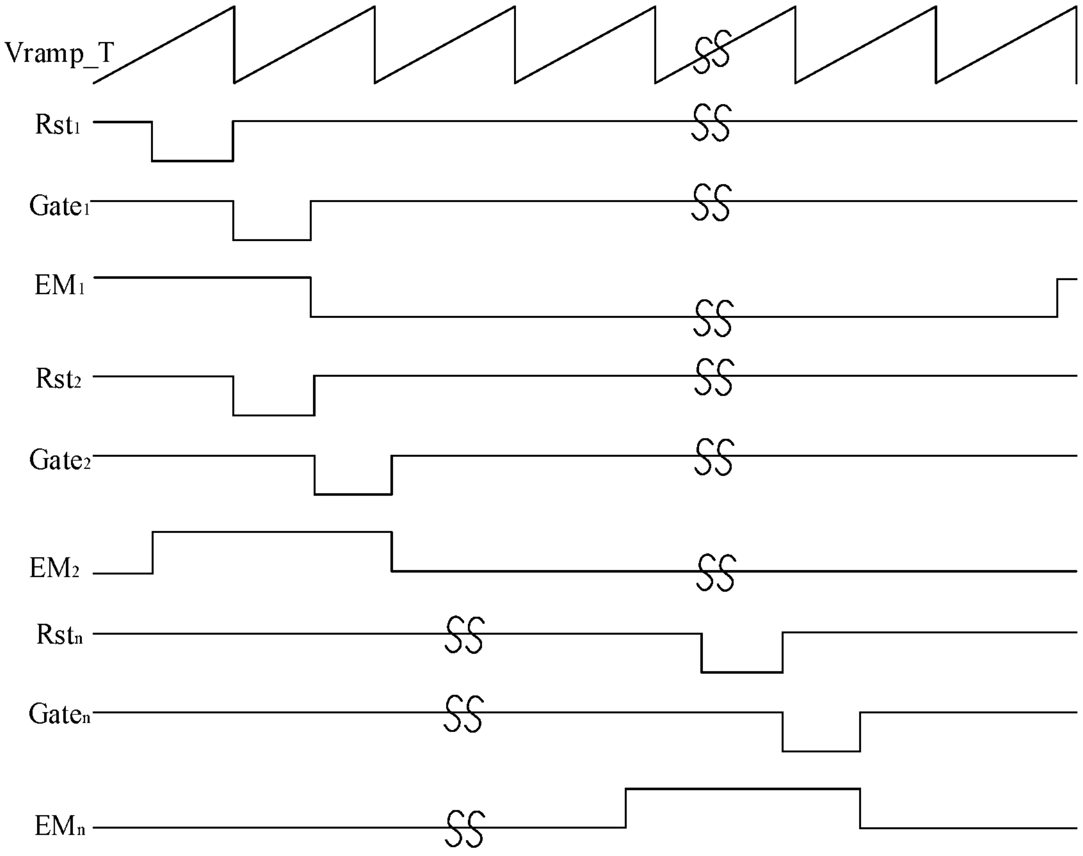
FIG. 12 is another time sequence diagram of the pixel driving circuit shown in FIG. 6.

FIG. 12 is a time sequence diagram of FIG. 6, which is a signal sequence diagram of a pixel driving circuit 10 of multiple rows of pixels in one frame period. As shown in FIG. 1, if the display device in the embodiment includes n rows of pixels 1, a subscript of a signal denoted by roman numerals should be understood as corresponding number of rows. For example, the reset control signal Rst1, the data write control signal Gate1 and the work control signal EM1 are signals input to the first row of pixels 1, namely, signals input to the pixel driving circuit 10 of the first row of pixels 1. The reset control signal Rstn, the data write control signal Gaten and the work control signal EMn are signals input to the n-th row of pixels 1, namely, signals input to the pixel driving circuit 10 of the n-th row of pixels and so on. Further, as known from the figure, before inputting signal to the next row of pixels 1, it is required to input the work control signal EM to the row of pixels 1 firstly such that the corresponding time signal Vdata_T and the corresponding reference voltage signal Vramp_T can be compared to determine the brightness of the to-be-driven element 20 in the time of this frame and control the row of pixels 1 to be lighted up, thus avoiding delayed display.

Since the method embodiments basically correspond to the apparatus embodiments, reference may be made to the descriptions of the apparatus embodiments for relevant parts. The method embodiments and the apparatus embodiments are mutually supplemented.

The foregoing disclosure is merely illustrative of preferred embodiments of the present disclosure but not intended to limit the present disclosure, and any modifications, equivalent substitutions and improvements thereof made within the spirit and principles of the present disclosure shall be encompassed in the scope of protection of one or more embodiments in the present disclosure.

The invention claimed is:

1. A pixel driving circuit, configured to provide a signal for a to-be-driven element, comprising:

a current control sub-circuit, configured to transmit a current signal;

a time length control sub-circuit, configured to transmit a time signal; and an output sub-circuit, electrically connected with the time length control sub-circuit and the current control sub-circuit, respectively, wherein the time length control sub-circuit is further configured to control the output sub-circuit to be turned on or off based on the time signal, the output sub-circuit is configured to, when turned on, control a current applied to the to-be-driven element based on the current signal, wherein in a light emission stage, duration of two adjacent turn-ons of the output sub-circuit is same and duration of two adjacent turn-offs of the output sub-circuit is same such that in the light emission stage duration of two adjacent turn-ons of the to-be-driven element is same and duration of two adjacent turn-offs of the to-be-driven element is same, wherein the time length control sub-circuit comprises a comparator, the comparator is configured to compare the time signal and a reference voltage signal to generate a comparison signal and control the output sub-circuit to be turned on or off based on the comparison signal, wherein the comparison signal is a periodic square wave signal.

2. The pixel driving circuit of claim 1, wherein, the comparator comprises a non-inverting input terminal, an inverting input terminal and an output terminal;

the non-inverting input terminal is configured to receive one of the time signal and the reference voltage signal;

the inverting input terminal is configured to receive other of the time signal and the reference voltage signal;

the output terminal is connected with the output sub-circuit.

3. The pixel driving circuit of claim 2, wherein the reference voltage signal comprises one of a ramp signal, a triangle wave signal, a sawtooth wave signal, a sine wave signal and a cosine wave signal.

4. The pixel driving circuit of claim 3, wherein the reference voltage signal is a high frequency signal, and a frequency of the reference voltage signal is equal to or greater than 750 Hz and equal to or smaller than 7500 Hz.

5. The pixel driving circuit of claim 2, wherein, the time length control sub-circuit further comprises a time length write sub-circuit and a time length storage capacitor;

the time length write sub-circuit is connected with the non-inverting input terminal or the inverting input terminal of the comparator;

a first terminal of the time length storage capacitor is grounded and a second terminal of the time length storage capacitor is connected with the time length write sub-circuit and connected with the comparator.

6. The pixel driving circuit of claim 1, wherein, the current control sub-circuit comprises a current write sub-circuit and a compensation sub-circuit, a first terminal of the current write sub-circuit is configured to receive the current signal and a second terminal of the current write sub-circuit is connected with the compensation sub-circuit, a first terminal of the compensation sub-circuit is connected with the current write sub-circuit and a second terminal of the compensation sub-circuit is connected with the output sub-circuit.

7. The pixel driving circuit of claim 6, wherein, the compensation sub-circuit comprises a compensation transistor, a current storage capacitor and a first drive transistor;

a first electrode of the first drive transistor is connected with the current write sub-circuit, a second electrode of the first drive transistor is connected with a first electrode of the compensation transistor, a gate electrode of the first drive transistor and a second electrode of the compensation transistor are both connected with the current storage capacitor, and a gate electrode of the compensation transistor is connected with a data write control signal line.

8. The pixel driving circuit of claim 7, wherein, a channel width-length ratio of the first drive transistor is greater than 3.

9. The pixel driving circuit of claim 6, wherein the current write sub-circuit comprises a current write transistor.

10. The pixel driving circuit of claim 1, further comprising a work control sub-circuit, wherein, the work control sub-circuit comprises a first control transistor;

a first electrode of the first control transistor is connected with the current control sub-circuit;

a second electrode of the first control transistor is connected with the output sub-circuit;

a gate electrode of the first control transistor is connected with a work control signal line, and the work control signal line is configured to input a work control signal to the first control transistor so as to control the first control transistor to be turned on or off;

wherein the first control transistor is configured to, when turned on, transmit the current signal to the output sub-circuit.

11. The pixel driving circuit of claim 10, wherein, the work control sub-circuit further comprises a second control transistor;

a first electrode of the second control transistor is connected with a power supply terminal, a second electrode of the second control transistor is connected with the current control sub-circuit.

12. The pixel driving circuit of claim 11, wherein, the work control sub-circuit further comprises a third control transistor, a first electrode of the third control transistor is connected with the output sub-circuit, and a second electrode of the third control transistor is connected with the to-be-driven element.

13. The pixel driving circuit of claim 12, wherein, the output sub-circuit comprises an output transistor, a first electrode of the output transistor is connected with the second electrode of the first control transistor, a second electrode of the output transistor is connected with the first electrode of the third control transistor.

14. The pixel driving circuit of claim 1, further comprising a reset sub-circuit; wherein, the reset sub-circuit comprises a reset transistor, a gate electrode of the reset transistor is connected with a reset control line, a first electrode of the reset transistor is connected with a reset signal terminal, a second electrode of the reset transistor is connected with at least one of the current control sub-circuit, the time length control sub-circuit and the to-be-driven element and configured to reset the at least one of the current control sub-circuit, the time length control sub-circuit and the to-be-driven element.

15. A display device, comprising a to-be-driven element, and a pixel driving circuit is configured to provide signals for the to-be-driven element and the to-be-driven element is a current driven light emitting diode, wherein the pixel driving circuit comprises:

a current control sub-circuit, configured to transmit a current signal;

a time length control sub-circuit, configured to transmit a time signal; and an output sub-circuit, electrically connected with the time length control sub-circuit and the current control sub-circuit, respectively, wherein the time length control sub-circuit is further configured to control the output sub-circuit to be turned on or off based on the time signal, the output sub-circuit is configured to, when turned on, control a current applied to the to-be-driven element based on the current signal, wherein in a light emission stage, duration of two adjacent turn-ons of the output sub-circuit is same and duration of two adjacent turn-offs of the output sub-circuit is same such that in the light emission stage duration of two adjacent turn-ons of the to-be-driven element is same and duration of two adjacent turn-offs of the to-be-driven element is same, wherein the time length control sub-circuit comprises a comparator, the comparator is configured to compare the time signal and a reference voltage signal to generate a comparison signal and control the output sub-circuit to be turned on or off based on the comparison signal, wherein the comparison signal is a periodic square wave signal.

16. The display device of claim 15, wherein, the comparator comprises a non-inverting input terminal, an inverting input terminal and an output terminal;

the non-inverting input terminal is configured to receive one of the time signal and the reference voltage signal;

the inverting input terminal is configured to receive other of the time signal and the reference voltage signal;

the output terminal is connected with the output sub-circuit.

17. The display device of claim 16, wherein the reference voltage signal comprises one of a ramp signal, a triangle wave signal, a sawtooth wave signal, a sine wave signal and a cosine wave signal.

18. The display device of claim 17, wherein the reference voltage signal is a high frequency signal, and a frequency of the reference voltage signal is equal to or greater than 750 Hz and equal to or smaller than 7500 Hz.

* * * * *